United States Patent
Bolze et al.

[11] Patent Number: 5,898,901
[45] Date of Patent: *Apr. 27, 1999

[54] CARRIER-FREQUENCY TRANSMISSION OF DIGITAL RETURN SIGNALS IN BURST MODE

[75] Inventors: Thomas Bolze; Stephan Neidlinger, both of Munich, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/525,403

[22] Filed: Sep. 7, 1995

[30] Foreign Application Priority Data

Sep. 7, 1994 [DE] Germany .............. 44 31 884

[51] Int. Cl.⁶ .................................. H04N 7/173
[52] U.S. Cl. .............................. 455/5.1; 348/12
[58] Field of Search ................. 348/12, 13, 6, 348/7, 10, 11, 14, 15, 16, 17, 18; 455/5.1, 4.2, 4.1, 3.1, 6.2, 6.3, 47, 108, 109; 375/300, 301, 270, 268, 260, 286; 332/149, 170; H04N 7/16, 7/173

[56] References Cited

U.S. PATENT DOCUMENTS

| | | | |
|---|---|---|---|
| 3,605,017 | 9/1971 | Chertok et al. | 375/301 |
| 4,355,397 | 10/1982 | Stuart | 375/17 |
| 4,625,319 | 11/1986 | Krawitz | 375/61 |
| 5,387,927 | 2/1995 | Look et al. | 348/6 |
| 5,408,259 | 4/1995 | Warwick | 348/6 |
| 5,528,582 | 6/1996 | Bodeep et al. | 348/12 |
| 5,553,064 | 9/1996 | Paff et al. | 348/10 |
| 5,557,319 | 9/1996 | Gurusami et al. | 348/12 |

*Primary Examiner*—Chris Grant
*Attorney, Agent, or Firm*—Hill & Simpson

[57] ABSTRACT

Quadrature amplitude modulation with two carrier signals orthogonal relative to one another is often used for the transmission of digital television and/or radio signals from a head end to subscribers in coaxial cable networks. This modulation method, however, is poorly suited for the return channel from the subscribers to the central because, due to the multitude of subscribers, the subscriber signals are often transmitted in burst mode. Thus, there is not adequate time for the phase-exact recovery of the carrier signals at the reception side. A single sideband amplitude modulation of the digital transmission signals is therefore undertaken for the carrier-frequency transmission of digital signals in burst mode.

14 Claims, 2 Drawing Sheets

CARRIER-FREQUENCY TRANSMISSION OF DIGITAL RETURN SIGNALS IN BURST MODE

BACKGROUND OF THE INVENTION

The invention is directed to a method for the transmission of digital signals in burst mode, that is, in what is referred to as time-division multiple access (TDMA).

In addition to wireless transmission of television and/or radio signals by radiotelegraphy, these signals are often transmitted from a central to a plurality of subscribers via coaxial cables. Due to the transmission properties of the coaxial cables, the transmission thereby usually ensues with carrier frequency methods, whereby quadrature amplitude modulation (QAM) methods are provided for achieving a corresponding bandwidth efficiency given digital transmission. In this method, two carrier signals that are orthogonal to one another in terms of phase are transmitted, whereby each carrier can be modulated with a plurality of amplitude levels. For demodulation, an optimally phase-exact carrier signal must also be available in the receiver in order to keep losses due to crosstalk of the respectively orthogonal channel low.

A greater bandwidth for the transmission from the central to the subscribers is required given expansion of such coaxial cable transmission networks by a greater number of programs and by what are referred to as interactive services such as, for example, interactive television in the form of teleshopping and multimedia applications, so that only a few frequency bands are still available for the transmission of the signals of the interactive services from the subscribers to the central. Difficulties occur in providing adequate bandwidth available for these signals. Additional difficulties result in that only a short time span in a periodic cycle is available to the individual subscriber stations because of the use of a shared transmission path to the central. The signals deriving from the subscribers are transmitted in what is referred to as time-division multiple access (TDMA). At the beginning of the reception time, however, an optimally phase-exact synchronization to the received carrier signal must ensue in the receiver. The problem thus arises that only a short synchronization time and, thus, a short response time are available for the phase synchronization circuits that are usually employed. However, this corresponds to a large bandwidth, so that a corresponding phase precision of the demodulated carrier signal can only be achieved with difficulty or with great outlay correspondingly long signal bursts and, thus, a lower number of subscribers.

SUMMARY OF THE INVENTION

It is an object of the present invention to provide a method for the carrier-frequency transmission of digital signals in burst mode that does not require long synchronization times at the receiver and that can also be utilized on the [ . . . ] already outside the specified transmission bandwidth of the coaxial cables employed.

This object is inventively achieved in that the method of the type initially cited is a method for carrier-frequency transmission of digital signals in burst mode, wherein digital signals are subjected to a single sideband amplitude modulation before transmission. The inventive method is thereby based on the perception that no carrier signals that are orthogonal relative to one another are to be transmitted in the inventive modulation method, and that, due to the transmission of only one sideband, the modulation rate (transmission speed) is twice as high as in quadrature amplitude modulation given the same bandwidth. A development of the inventive method, wherein the signals can assume more than two amplitude levels in the single sideband amplitude modulation, leads to an even better bandwidth efficiency. The inventive method is thereby suitable both for the transmission of amplitude-modulated signals via coaxial cables or light waveguide cables or also for transmission of these signals by radiotelegraphy. Specific developments of the method for the transmission of the return signals from subscribers in a coaxial cable television network are as follows. The transmission of the amplitude-modulated signals in burst mode ensues from a plurality of subscribers to a central, whereas television and/or radio signals are transmitted from the central to the subscribers in continuous mode, optionally in analog and or combined with multistage quadrature amplitude modulation. The transmission of the amplitude 3-modulated signals from the subscribers to the central ensues a frequency band that lies above the frequency band used for transmission from the central to the subscribers.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGS. of which like reference numerals identify like elements, and in which:

DESCRIPTION OF THE PREFERRED EMBODIMENTS

Figure 1:
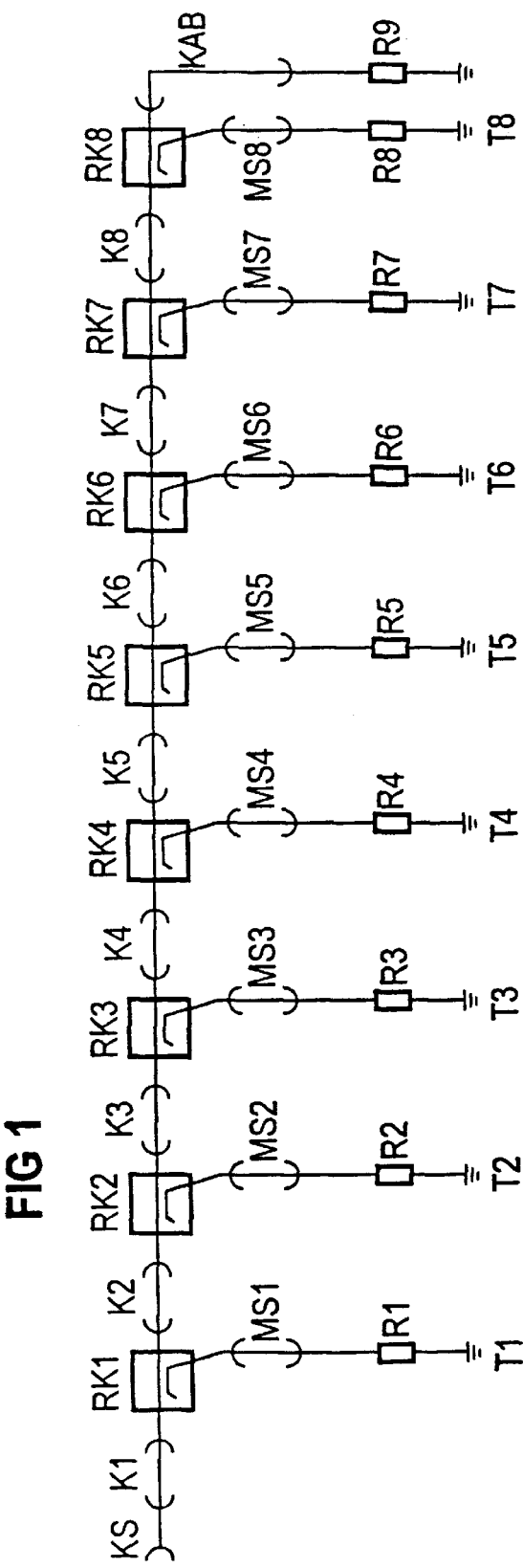
FIG. 1 is a schematic diagram of an inventive transmission system.

A head end KS in FIG. 1 is connected, for example, to an output amplifier of a larger, active coaxial cable network or to a central, this head end KS outputs the signals to be transmitted onto a first cable link Kl and accepts signals of the connected subscribers therefrom. A first directional coupler RK1 is connected to the first cable link K1, this directional coupler RK1 coupling signals out with a coupling attenuation of about 20 dB at a first measuring location MS1 at which a first load resistor R1 is connected to ground. A second cable link K2 and a second directional coupler RK2 are connected to the first directional coupler RK1. Third through eighth cable links K3 . . . K8 and a third through eighth directional couplers RK3 . . . RK8, are connected to this second directional coupler RK2 as depicted in FIG. 1. In the exemplary embodiment, the coupling attenuation up to the fifth directional coupler RK5 is selected at 20 dB; a coupling attenuation of 15 dB was set for the sixth and seventh directional couplers due to the signal having been highly attenuated by the cable link. A coupling attenuation of 10 dB is set for the eighth directional coupler RK8. A cable termination KAB with a ninth resistor R9 to ground is connected to the eighth directional coupler. The load resistors R1 . . . R8 connected to the individual measuring locations MS1 . . . MS8 as well as the resistor R9 are selected at 75 Ω each in view of the characteristic impedance of the coaxial cable. The length of the coaxial cables to the first subscriber T1 is 20 m, 60 m to the second subscriber T2, 100 m to the third subscriber T3, 150 m to the fourth subscriber T4, 180 m to the fifth subscriber T5, 230 m to the sixth subscriber T6, 270 m to the seventh subscriber T7 and 320 m to the eighth subscriber T8. The attenuation for signals transmitted from the head end KS with a frequency of 640 MHz thereby rose from 21.3 dB at the first subscriber T1 to 37 dB at the eighth subscriber T8. Approximately the same attenuation up to the third subscriber derived for a signal having a frequency of 780 MHz as for a signal at 640 MHz. An additional attenuation of 4 dB derived up to the eighth subscriber. Even though the coaxial cable employed was only specified for up to 450 MHz, measurements showed that signal levels adequate for a network operation were present at the individual measuring locations both for a signal frequency of 640 MHz as well as about 860 MHz.

Figure 2:
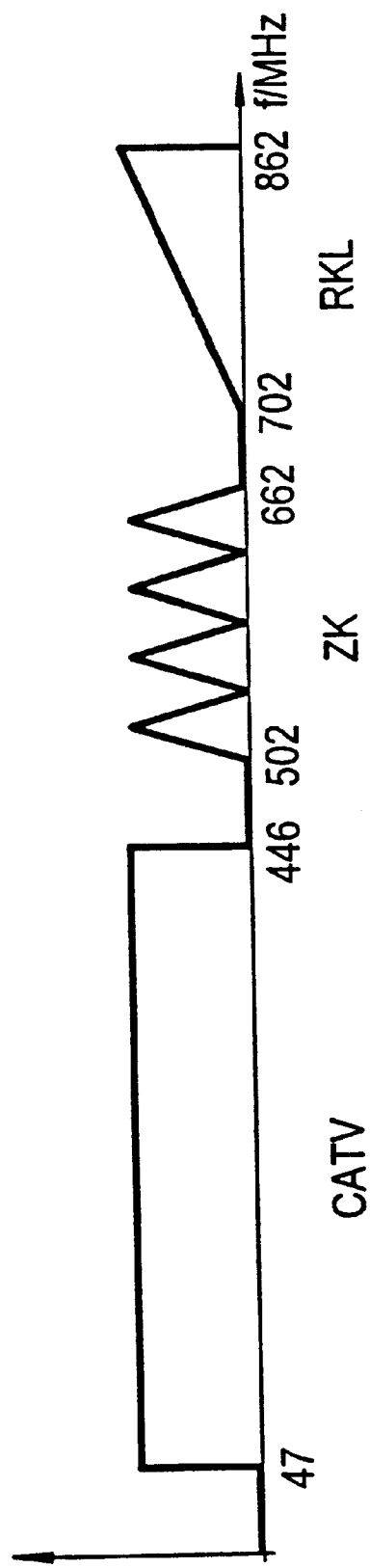
FIG. 2 depicts the position of the frequency bands in the inventive transmission system.

FIG. 2 shows a frequency plot for the signals transmitted over the coaxial cable system of FIG. 1. According to the Prior Art, the coaxial cable system is configured for the transmission of cable television signals CATV that are transmitted in the frequency range from 47 to 446 MHz. Four additional carriers for the transmission of digital signals with a bit rate of 156 Mbit/s that are transmitted in the frequency range between 502 and 662 MHz as auxiliary channels ZK are provided for the digital transmission of further television signals, for example programs selected by the subscriber.

The return channel RKL, which is located in the frequency range between 702 and 862 MHz serves for the transmission of the amplitude-modulated signals in burst mode from a plurality of subscribers T1 ... T8 to a central in the form of a head station KS. Also, as the level values up to the coaxial cable system of FIG. 1 prove, transmission can also be carried out in this frequency range with acceptable attenuation. The carrier frequency was selected as 862 MHz given a gross bit rate of 156 Mbit/s. Since the lower sideband of the amplitude-modulated signal is transmitted, the frequency band from 702 through 862 MHz and, thus, a bandwidth efficiency of about 1 bit/s/Hz results. It has thus been shown that bandwidth-efficient transmission of digital signals from subscribers to a central is possible with the inventive method even in the already highly attenuating frequency range around 800 MHz given the coaxial cables employed in cable television systems.

In a modification of the present invention radio links are employed instead of coaxial cables for at least a part of the transmission path. It turns out that the inventive method for carrier-frequency, direct transmission of digital signals in burst mode can also be advantageously employed in this case.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for carrier-frequency transmission of digital return signals in burst mode, comprising: modulating the digital return signals with single sideband amplitude modulation; and transmitting the amplitude modulated digital return signals in burst mode in a frequency range of substantially 702 MHZ to 862 MHZ.

2. The method according to claim 1, wherein the digital signals have at least three amplitude levels in the single sideband amplitude modulation.

3. The method according to claim 1, wherein the transmission of the amplitude-modulated signals ensues via coaxial cables.

4. The method according to claim 3, wherein the transmission of the amplitude-modulated signals in burst mode ensues from a plurality of subscribers to a central, at least one of television signals and radio signals being transmitted from the central to the subscribers in continuous mode, in at least one of analog and analog combined with multi-stage quadrature amplitude modulation.

5. The method according to claim 4, wherein the transmission of the amplitude-modulated signals from the subscribers to the central ensues in a frequency band that lies above the frequency band used for transmission from the central to the subscribers.

6. The method according to claim 1, wherein the transmission ensues with radiotelegraphy.

7. A method for carrier-frequency transmission of digital return signals in burst mode, comprising: modulating the digital return signals with single sideband amplitude modulation such that the digital signals have at least three amplitude levels in the single sideband amplitude modulation; and transmitting the amplitude modulated digital return signals in burst mode in a frequency range of substantially 702 MHZ to 862 MHZ.

8. The method according to claims 7, wherein the transmission of the amplitude-modulated signals ensues via coaxial cables.

9. The method according to claim 7, wherein the transmission of the amplitude-modulated signals in burst mode ensues from a plurality of subscribers to a central, at least one of television signals and radio signals being transmitted from the central to the subscribers in continuous mode.

10. The method according to claim 7, wherein the transmission of the amplitude-modulated signals from the subscribers to the central ensues in a frequency band that lies above the frequency band used for transmission from the central to the subscribers.

11. The method according to claim 7, wherein the transmission ensues with radiotelegraphy.

12. A method for carrier-frequency transmission of digital return signals in burst mode, comprising: modulating the digital return signals with single sideband amplitude modulation; transmitting the amplitude modulated digital signals in burst mode in a frequency range of substantially 702 MHZ to 862 MHZ via coaxial cables from a plurality of subscribers to a central, at least one of television signals and radio signals being transmitted from the central to the subscribers in continuous mode in at least one of analog and analog combined with multi-stage quadrature amplitude modulation, the transmission of the modulated digital signals from the subscribers to the central being in a frequency band that lies above the frequency band used for transmission from the central to the subscribers.

13. The method according to claim 12, wherein the digital signals have at least three amplitude levels in the single sideband amplitude modulation.

14. The method according to claim 12, wherein the transmission ensues with radiotelegraphy.

* * * * *